(12) United States Patent
Kim et al.

(10) Patent No.: US 9,691,132 B2
(45) Date of Patent: Jun. 27, 2017

(54) METHOD AND APPARATUS FOR INFERRING FACIAL COMPOSITE

(71) Applicant: KOREA INSTITUTE OF SCIENCE AND TECHNOLOGY, Seoul (KR)

(72) Inventors: Ig Jae Kim, Goyang-si (KR); Young Ju Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 190 days.

(21) Appl. No.: 14/431,464

(22) PCT Filed: Jun. 24, 2013

(86) PCT No.: PCT/KR2013/005563
§ 371 (c)(1),
(2) Date: Mar. 26, 2015

(87) PCT Pub. No.: WO2014/051246
PCT Pub. Date: Apr. 3, 2014

(65) Prior Publication Data
US 2015/0278997 A1 Oct. 1, 2015

(30) Foreign Application Priority Data
Sep. 26, 2012 (KR) .................. 10-2012-0107486

(51) Int. Cl.
*G06T 7/00* (2017.01)
*G06T 3/40* (2006.01)
(Continued)

(52) U.S. Cl.
CPC ...... *G06T 3/4053* (2013.01); *G06F 17/30247* (2013.01); *G06K 9/00281* (2013.01);
(Continued)

(58) Field of Classification Search
CPC ............ G06T 3/4053; G06F 17/30247; G06K 9/00281; G06K 9/6269
See application file for complete search history.

(56) References Cited

U.S. PATENT DOCUMENTS

| 5,375,195 A | 12/1994 | Johnston |
| 6,731,302 B1 * | 5/2004 | Cote ............ G06T 11/00 345/619 |

(Continued)

FOREIGN PATENT DOCUMENTS

| JP | 2003-108979 A | 4/2003 |
| KR | 1999-0050271 A | 7/1999 |

(Continued)

OTHER PUBLICATIONS

Xie, Chunyan, Kumar, B.V.K Vijaya, "Face Class Code Based Feature Extraction for Facial Recognition" IEEE Workshop on Automatic Identification Advanced Technologies. 2005.*

(Continued)

*Primary Examiner* — Kim Vu
*Assistant Examiner* — Molly Delaney
(74) *Attorney, Agent, or Firm* — NSIP Law (57) ABSTRACT

Provided is a method and apparatus for inferring a facial composite, whereby user's designation regarding at least one point of a facial image is received, facial feature information are extracted based on the received user's designation, a facial type that coincides with the extracted facial feature information is searched from a facial composite database to generate a face shape model based on the searched facial type and an initial facial composite model having a facial type similar to a face of the facial image from a low-resolution facial image through which face recognition or identification cannot be accurately performed is provided, so that the face shape model contributes to crimi- (Continued)

nal arrest and a low-resolution facial image captured by a surveillance camera can be more efficiently used.

13 Claims, 7 Drawing Sheets

(51) Int. Cl.
    *G06F 17/30*     (2006.01)
    *G06K 9/00*     (2006.01)
    *G06K 9/62*     (2006.01)
    *G06T 5/50*     (2006.01)

(52) U.S. Cl.
CPC .............. *G06K 9/6269* (2013.01); *G06T 5/50* (2013.01); *G06T 2207/10004* (2013.01); *G06T 2207/20081* (2013.01); *G06T 2207/20221* (2013.01); *G06T 2207/30201* (2013.01)

(56) References Cited

U.S. PATENT DOCUMENTS

| | | | |
|---|---|---|---|
| 6,845,171 B2* | 1/2005 | Shum | G06K 9/00221 |
| | | | 382/100 |
| 7,003,140 B2 | 2/2006 | Venkatachalam | |
| 7,055,103 B2* | 5/2006 | Lif | G06Q 10/02 |
| | | | 382/118 |
| 7,653,220 B2* | 1/2010 | Nishimori | G06T 11/00 |
| | | | 382/118 |
| 7,668,402 B2* | 2/2010 | Grindstaff | G06T 11/00 |
| | | | 345/629 |
| 8,285,008 B2* | 10/2012 | Ishii | G06F 17/30781 |
| | | | 382/115 |
| 9,129,381 B2* | 9/2015 | Steinberg | G06T 7/0081 |
| 9,235,320 B2* | 1/2016 | Kinn | G06T 11/00 |
| 2005/0108282 A1* | 5/2005 | Venkatachalam | G06F 17/30277 |
| 2008/0298643 A1* | 12/2008 | Lawther | G06F 17/30256 |
| | | | 382/118 |
| 2009/0003708 A1* | 1/2009 | Steinberg | G06T 7/0081 |
| | | | 382/190 |
| 2011/0087677 A1 | 4/2011 | Yoshio et al. | |
| 2011/0135205 A1* | 6/2011 | Rhee | G06T 7/60 |
| | | | 382/195 |

FOREIGN PATENT DOCUMENTS

| | | |
|---|---|---|
| KR | 10-2004-0009460 A | 1/2004 |
| KR | 10-0504594 B1 | 8/2005 |
| KR | 10-2008-0046490 A | 5/2008 |
| KR | 10-2008-0106596 A | 12/2008 |

OTHER PUBLICATIONS

International Search Report issued on Oct. 11, 2013, in counterpart International Application No. PCT/KR2013/005563 (3 pages, in English).

Korean Notice of Allowance issued on Mar. 28, 2014, in counterpart Korean Application No. 10-2012-0107486 (1 page in English, 5 pages in Korean).

* cited by examiner

METHOD AND APPARATUS FOR INFERRING FACIAL COMPOSITE

CROSS-REFERENCE TO RELATED APPLICATIONS

This application claims priority under §371 as a National Stage filing from Application No. PCT/KR2013/005563 filed on Jun. 24, 2013, which claims priority from Korean Patent Application No. 10-2012-0107486, filed Sep. 26, 2012, and all the benefits accruing therefrom under 35 U.S.C. §119, the contents of which in its entirety are herein incorporated by reference.

TECHNICAL FIELD

The present invention relates to a method and apparatus for inferring a facial composite, and more particularly, to a method and apparatus for inferring a facial composite, whereby user's designation regarding at least one point of a facial image is received from an external device, facial feature information are extracted from the facial image based on the user's designation, a facial type that coincides with the extracted facial feature information is searched from a facial composite database and a face shape model is generated based on the searched facial type.

The present invention is derived from research carried out as a part of Industrial Fusion Original Technology Development Business of the Ministry of Knowledge Economy (MKE) and the Korea Evaluation Institute of Industrial Technology (KEIT) [Subject unique number: 2MR0270, Subject name: Development of 3D facial composite generation and facial transformation prediction system according to age].

BACKGROUND ART

To solve criminal event, images captured by surveillance cameras, closed circuit televisions (CCTVs), or black boxes, provide an important clue. However, it is difficult to accurately identify a face of a person who appears in a captured image from a large amount of images captured by these devices for reasons of a low resolution of the captured image, a lighting effect caused by peripheral light, and the difficulty of identification due to a covered face. Among these, in case of a low resolution of the captured image, technologies for improving or correcting the resolution of the captured image, including a super resolution (SR) technique, have been proposed.

In the SR technique, an optical limitation caused by miniaturization of a camera, a limitation in a spatial resolution caused by an insufficient number of pixels of a charge-coupled device (CCD)/complementary metal oxide semiconductor (CMOS) image sensor, and blur of a video sequence due to noise generated during image compression, transmission, and storing are removed, and a low-resolution image is corrected to a high-resolution image. An example of the SR technique is disclosed in Korean Patent Registration No. 0504594.

However, in spite of the SR technique, in actuality, it is difficult to accurately identify a face of a person who appears in the captured image by simply performing resolution correction.

Thus, a system that searches a facial type similar to a shape of a face from facial images captured at a low resolution to infer a face shape model, is required. The face shape model may serve as an initial facial composite model that may be a starting point in making a facial composite of a criminal in a situation in which a face of the suspect who appears in a captured image cannot be accurately identified. There is Korean Patent Registration No. 0504594 as a prior-art document thereof.

DISCLOSURE

Technical Problem

The present invention provides a method and apparatus for inferring a facial composite, whereby a similar facial type to a type of a face that appears in a low-resolution facial image through which accurate face recognition or identification cannot be performed, is searched from a facial composite database that has been already established from the low-resolution facial image to infer a face shape model that can be utilized as an initial facial composite model that may be a starting point in making a facial composite of a criminal.

Technical Solution

According to an aspect of the present invention, there is provided a method of inferring a facial composite including receiving user's designation regarding at least one point of a facial image; extracting facial feature information regarding a predetermined item so as to identify the facial image based on the received user's designation; searching a facial type that coincides with the extracted facial feature information using a support vector machine (SVM) from a facial composite database in which feature information according to facial type have been already learned through the SVM and are classified in a hierarchical structure having a plurality of levels and are stored; and generating a facial composite for generating a face shape model based on the searched facial type.

According to another aspect of the present invention, there is provided an apparatus for inferring a facial composite including a user input unit receiving user's designation regarding at least one point of a facial image; a facial feature information extraction unit extracting facial feature information regarding a predetermined item so as to identify the facial image based on the received user's designation; a facial composite database in which feature information according to facial type that have been learned through a support vector machine (SVM), are classified in a hierarchical structure having a plurality of levels and are stored; a facial composite database search unit searching a facial type that coincides with the extracted facial feature information using the SVM from the facial composite database; and a facial composite generation unit generating a facial composite for generating a face shape model based on the searched facial type.

According to another aspect of the present invention, there is provided a method of inferring a facial composite including performing a preprocessing of removing a background light source from a facial image and of increasing a resolution of the facial image; determining whether the facial image having an increased resolution through the preprocessing is successfully restored; if it is determined that restoration of the facial image having the increased resolution fails, receiving user's designation regarding at least one point of the facial image; extracting facial feature information regarding a predetermined item so as to identify the facial image based on the received user's designation; searching a facial type that coincides with the predetermined feature information according to facial type from a facial composite database in which feature information according to facial type have been already learned; and generating a face shape model based on the searched facial type.

Advantageous Effects

According to the present invention, an initial facial composite model of a facial type that is the similarest to a low-resolution facial image through which face recognition or identification cannot be accurately performed, so that the present invention contributes to criminal arrest and the low-resolution image captured by a surveillance camera can be more efficiently used.

DESCRIPTION OF DRAWINGS

The above and other features and advantages of the present invention will become more apparent by describing in detail exemplary embodiments thereof with reference to the attached drawings in which.

MODE FOR INVENTION

The following simply illustrates the principle of the present invention. Thus, although not clearly described or shown, it would be obvious to one of ordinary skill in the art to embody the principle of the present invention and to invent various apparatuses within the concept and scope of the present invention. Also, all conditional terms and embodiments enumerated in the present specification are clearly intended for understanding of the concept of the present invention, and the present invention should be understood not to be limited to specifically-enumerated embodiments and states. In addition, all detailed descriptions that enumerate the principle, viewpoint, embodiments, and a particular embodiment of the present invention should be understood to be intended to include structural and functional equivalents of these matters. In addition, these equivalents should be understood to include all devices invented to perform the same function regardless of commonly-used equivalents and equivalents to be developed in future, i.e., structures.

Thus, functions of various devices including processors or functional blocks indicated in a similar concept to the processors illustrated in the drawings may be provided by the usages of hardware having a capability of performing software in relation to appropriate software in addition to dedicated hardware. When functions are provided by a processor, the functions may be provided by a single dedicated processor, a single sharing processor, or a plurality of individual processors, and a part of them may be shared. In addition, the terms that represent a processor, control or a similar concept should not be interpreted by exclusively citing hardware having a capability of executing software and should be understood to implicitly include ROM, RAM, and nonvolatile memory for storing digital signal processor (DSP) hardware and software without restriction. Other commonly-used hardware may also be included.

The above-described purpose, features, and advantages will be apparent through the following detailed description relating to the attached drawings. In the description of the present invention, if it is determined that a detailed description of commonly-used technologies related to the invention may unnecessarily obscure the subject matter of the invention, the detailed description will be omitted, or a brief description will be provided.

When a portion "comprises" an element, it means that the portion does not exclude another element but may further include another element, unless specifically opposed description exists.

The present invention will now be described more fully with reference to the accompanying drawings, in which exemplary embodiments of the invention are shown.

Figure 1:
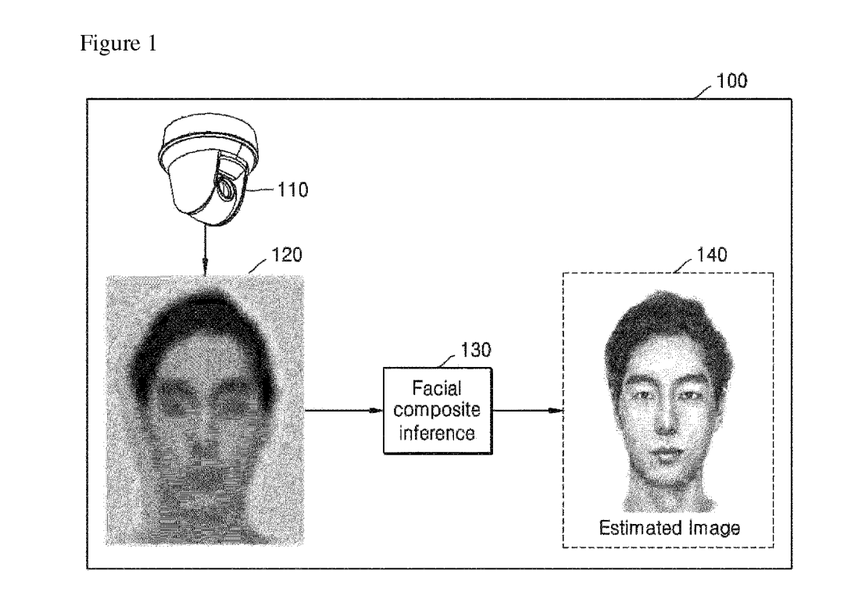
FIG. 1 is a view illustrating a configuration of an initial facial composite model provision system used to arrest a criminal, according to an exemplary embodiment of the present invention.

FIG. 1 is a view illustrating a configuration of an initial facial composite model provision system 100 used to arrest a criminal, according to an exemplary embodiment of the present invention.

Referring to FIG. 1, the initial facial composite model provision system 100 according to the current embodiment of the present invention includes a captured image acquisition device 110 and a facial composite inference device 130. It would be obvious that other elements except the above-described elements may be included in the initial facial composite model provision system 100.

The captured image acquisition device 110 performs a function of providing a facial image to the facial composite inference device 130 and may be a camera device installed at a predetermined position, a closed circuit television (CCTV) including a camera module, or a black box in which an image captured by a camera module is stored. They are just one embodiment for convenience of explanation, and aspects of the present invention are not limited thereto.

The facial composite inference device 130 extracts facial feature information regarding a predetermined item for identification from a low-resolution facial image 120 which is acquired by the captured image acquisition device 110 and in which a face to be searched is included, searches a facial type that coincides with the extracted facial feature information, and generates a face shape model based on the searched facial type.

The face shape model generated by the above-described facial composite inference device 130 may serve as an initial facial composite model 140 that may be a starting point in making a facial composite of a criminal in a situation in which a face of the suspect who appears in a captured image cannot be accurately identified.

Figure 2:
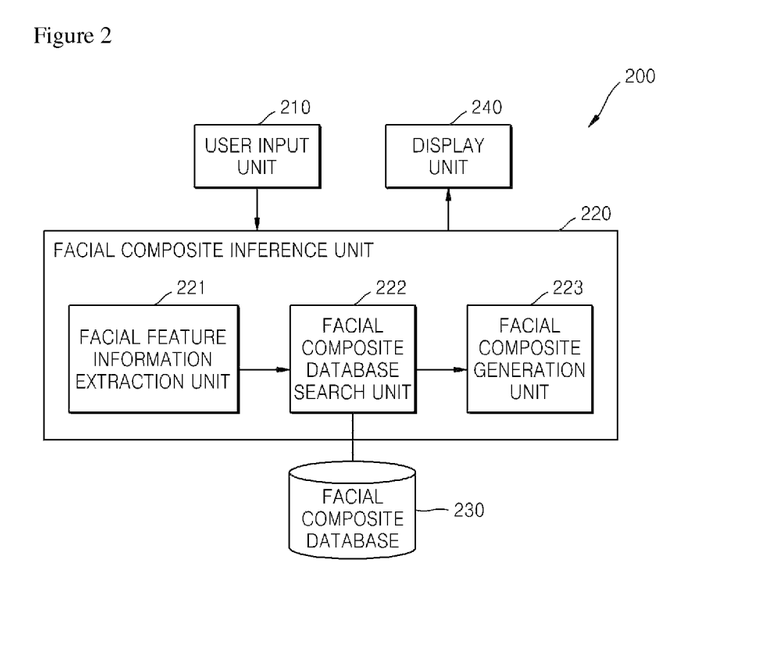
FIG. 2 is a block diagram illustrating a conceptual configuration of an apparatus for inferring a facial composite according to an exemplary embodiment of the present invention.

FIG. 2 is a block diagram illustrating a conceptual configuration of an apparatus for inferring a facial composite according to an exemplary embodiment of the present invention. Referring to FIG. 2, an apparatus 200 for inferring a facial composite according to the current embodiment of the present invention corresponds to the facial composite inference device 130 of the initial facial composite model provision system 100 illustrated in FIG. 1. Thus, the same matters of the apparatus 200 for inferring a facial composite as those of the facial composite inference device 130 of the initial facial composite model provision system 100 of FIG. 1 will be referred to FIG. 2.

Referring to FIG. 2, the apparatus 200 for inferring a facial composite according to the current embodiment of the present invention includes a user input unit 210, a facial composite inference unit 220, a facial composite database 230, and a display unit 240. Among these, the facial composite inference unit 220 may include a facial feature information extraction unit 221, a facial composite database search unit 222, and a facial composite generation unit 223. It would be obvious that other elements except for the above-described elements may be included in the apparatus 200 for inferring a facial composite or the facial composite inference unit 220.

At least a part of the user input unit 210, the facial composite inference unit 220, the facial feature information extraction unit 221, the facial composite database 222, the facial composite generation unit 223, the facial composite database 230, and the display unit 240 may be program modules that communicate with an external terminal device or an external server. These program modules that are operating systems, application program modules and other program modules may be included in the apparatus 200 for inferring a facial composite and may be physically stored in various types of commonly-used memory devices. Also, these program modules may be stored in a remote memory devices that are capable of communicating with the apparatus 200 for inferring a facial composite. These program modules comprehensively include a routine, a subroutine, a program, an object, a component, and a data structure, which perform particular tasks or execute particular abstract data types that will be described below, and aspects of the present invention are not limited thereto.

The apparatus 200 for inferring a facial composite illustrated in FIG. 2 may be included in or connected to a digital device, such as a personal computer (PC), e.g., a desktop computer, a laptop computer, a table computer, a palm top computer, etc., a workstation, a personal digital assistant (PDA), a web pad, or a mobile phone.

The display unit 240 may provide visual or auditory information to a user. In order to provide the visual information, the display unit 240 may be configured to include a display panel in which a liquid crystal display (LCD), a thin film transistor (TFT) or an organic electroluminescence (EL) device are used. For example, when the display unit 240 is configured of a touch screen, the display unit 240 may be configured to simultaneously operate as the user input unit 210.

The display unit 240 may provide information that are received, processed, or derived from the apparatus 200 for inferring a facial composite illustrated in FIG. 2, e.g., a received facial image or a generated 3D face shape model, to the user.

The user input unit 210 performs a function of receiving user's designation regarding at least one point of the facial image received from the apparatus 200 for inferring a facial composite of FIG. 2. To this end, the apparatus 200 for inferring a facial composite of FIG. 2 may receive user's designation regarding at least one point of the facial image from the user input unit 210 while the received facial image is displayed on the display unit 240.

The facial feature information extraction unit 221 extracts facial feature information regarding a predetermined item from the facial image so as to identify the facial image based on user's designation received from the user input unit 210. The facial feature information according to the present embodiment includes at least one feature point according to user's designation and length information of segments that connect feature points.

Feature information according to face shape that have been already learned through a support vector machine (SVM) are classified in a hierarchical structure having a plurality of levels and are stored in the facial composite database 230.

The facial composite database search unit 222 searches a facial type that coincides with the facial feature information that are extracted using the SVM, from the facial composite database 230.

The facial composite generation unit 223 generates a face shape model based on the facial type searched by the facial composite database search unit 222. In this case, since a two-dimensional (2D) to three-dimensional (3D) face shape model according to facial type has been already generated and stored in the facial composite database 230, the facial composite generation unit 223 may generate a face shape model corresponding to the searched facial type by loading the face shape model from the facial composite database 230.

Alternatively, according to an embodiment, the facial composite generation unit 223 displays an initial face shape model corresponding to the searched facial type on the display unit 240, receives an input on a user's correction instruction from the user input unit 210 while the initial face shape model is displayed, corrects the initial face shape model based on the user's correction instruction, thereby completing the face shape model.

The apparatus 200 for inferring a facial composite of FIG. 2 may further include a prerestoration unit (not shown).

The prerestoration unit (not shown) is an element that performs preprocessing before a facial composite inference process is performed. According to an embodiment, when a facial image on which preprocessing is performed, is successfully restored, the facial composite inference process may be omitted.

Figure 3:
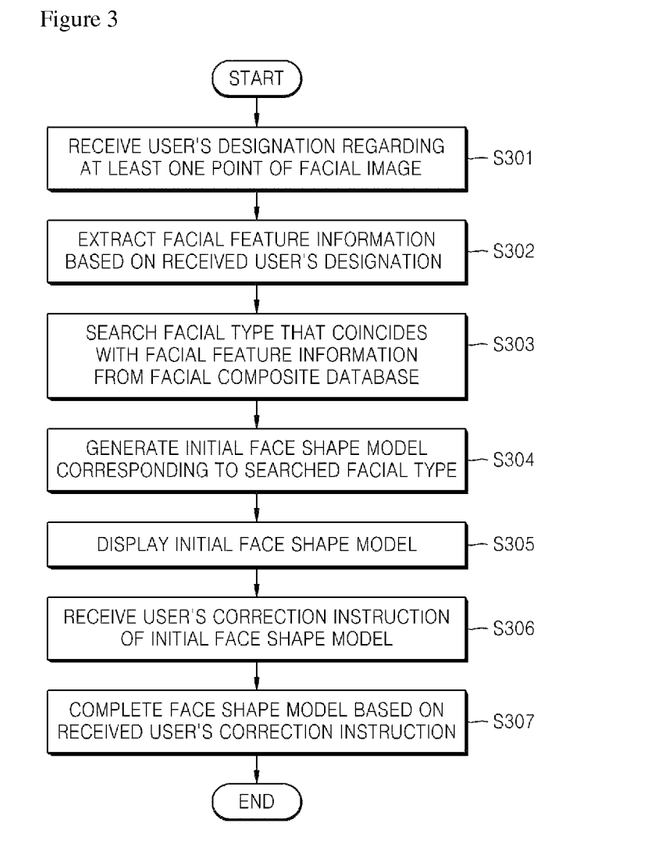
FIG. 3 is a flowchart illustrating a method of inferring a facial composite according to an exemplary embodiment of the present invention.

FIG. 3 is a flowchart illustrating a method of inferring a facial composite according to an exemplary embodiment of the present invention. Referring to FIG. 3, the method of inferring a facial composite according to the current embodiment of the present invention may be performed by the initial facial composite model provision system 100 illustrated in FIG. 1 or the apparatus for inferring a facial composite illustrated in FIG. 2. Thus, the same matters as those of the initial facial composite model provision system 100 illustrated in FIG. 1 or the apparatus for inferring a facial composite illustrated in FIG. 2 will be referred to FIG. 3.

User's designation regarding at least one point of a facial image is received (S301).

Facial feature information regarding a predetermined item so as to identify the facial image based on the user's designation received in operation S301 are extracted from the facial image (S302).

A facial type that coincides with the facial feature information extracted in operation S302 is searched from a facial composite database (S303).

A face shape model corresponding to the facial type searched in operation S303 is generated (S304).

An initial face shape model generated in operation S304 is displayed (S305).

A user's correction instruction on the initial face shape model displayed in operation S305 is received (S306).

The initial face shape model is corrected based on the user's correction instruction received in operation S306, thus completing the face shape model (S307).

Figure 4:
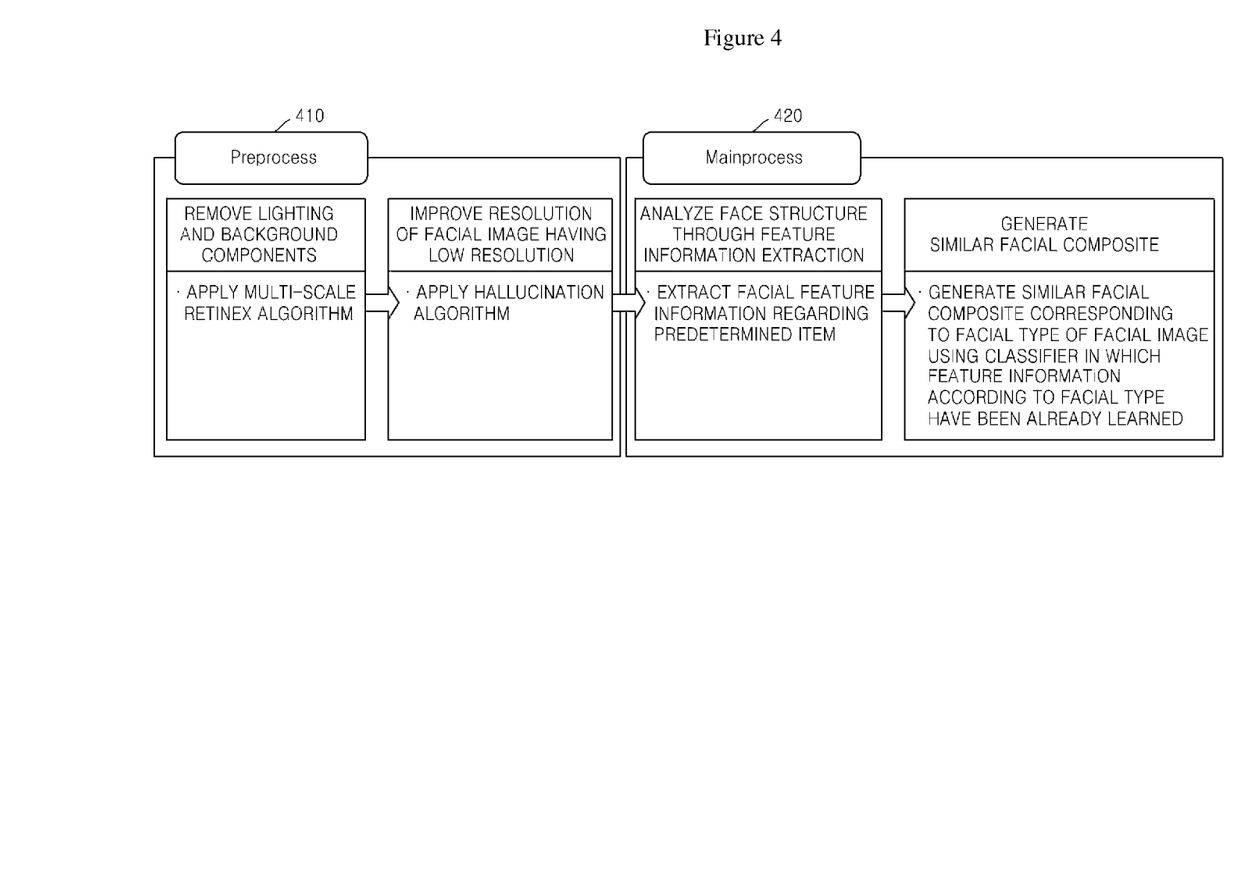
FIG. 4 is a view illustrating the entire operation of deriving an initial facial composite model from a low-resolution image of the method of inferring a facial composite illustrated in FIG. 3, according to an exemplary embodiment of the present invention.

FIG. 4 a view illustrating the entire operation of deriving an initial facial composite model from a low-resolution image of the method of inferring a facial composite illustrated in FIG. 3, according to an exemplary embodiment of the present invention. The entire operation of deriving the initial facial composite model illustrated in FIG. 4 is classified into a preprocess operation 410 and a main process operation 420.

The preprocess operation 410 is an operation of first correcting problems of a background light source and a low resolution of a target facial image. In the present embodiment, a multi-scale retinex (MSR) technique is used to remove the background light source of the target facial image, and a hallucination technique is used to first improve resolution of the target facial image having a low resolution.

In the MSR technique, contrast is improved using a peripheral average brightness value so that lighting and background components of the target facial image can be removed. More specifically, in the retinex technique, an average brightness value of an image that is a value corresponding to the background components or background light source of the target facial image is divided from an original image so as to obtain reflection components that are unrelated to the background light source. In this case, the background light source needs to be differently estimated according to region due to characteristics in which the background light source has a nonuniform distribution and is radiated onto a screen. Thus, the reflection components may be obtained using gaussian filter, an increase/decrease of details of a resultant image to which the retinex technique is applied according to the size of the gaussian filter, is determined, and thus quality of the image is determined.

In this case, when the retinex technique is applied based on one gaussian scale, it is very important how to determine a standard deviation value that is a gaussian scale value. Thus, applying the retinex technique based on various standard deviation values is referred to as a multi-scale retinex (MSR) technique.

In the present embodiment, the MSR technique is used as an algorithm for removing the background light source of the target facial image. However, this is just one embodiment for convenience of explanation, and aspects of the present invention are not limited thereto.

In order to improve the resolution of the facial image derived as a result of removing the background light source of the target facial image, in the present embodiment, the hallucination technique is used to embody the facial image. Details of the hallucination technique will be provided in FIG. 5.

In the present embodiment, the hallucination technique is used as an algorithm for first improving the resolution of the target facial image. However, this is just one embodiment for convenience of explanation, and aspects of the present invention are not limited thereto.

The main process operation 420 is secondarily performed when it is still difficult to identify or recognize the facial image firstly restored by performing the preprocess operation 410. In the present embodiment, feature information regarding the facial image are extracted from the facial image, a facial type corresponding to the facial image is searched using a classifier in which feature information according to facial type have been already learned, a face shape model corresponding to the searched facial type is estimated so that the face shape model having the largest similarity to the facial image can be provided using only minimum information. Suspect candidates can be more efficiently investigated using the face shape model provided in this way, and the face shape model contributes to criminal arrest. Details of the main process operation 420 will be provided in FIG. 7.

Figure 5:
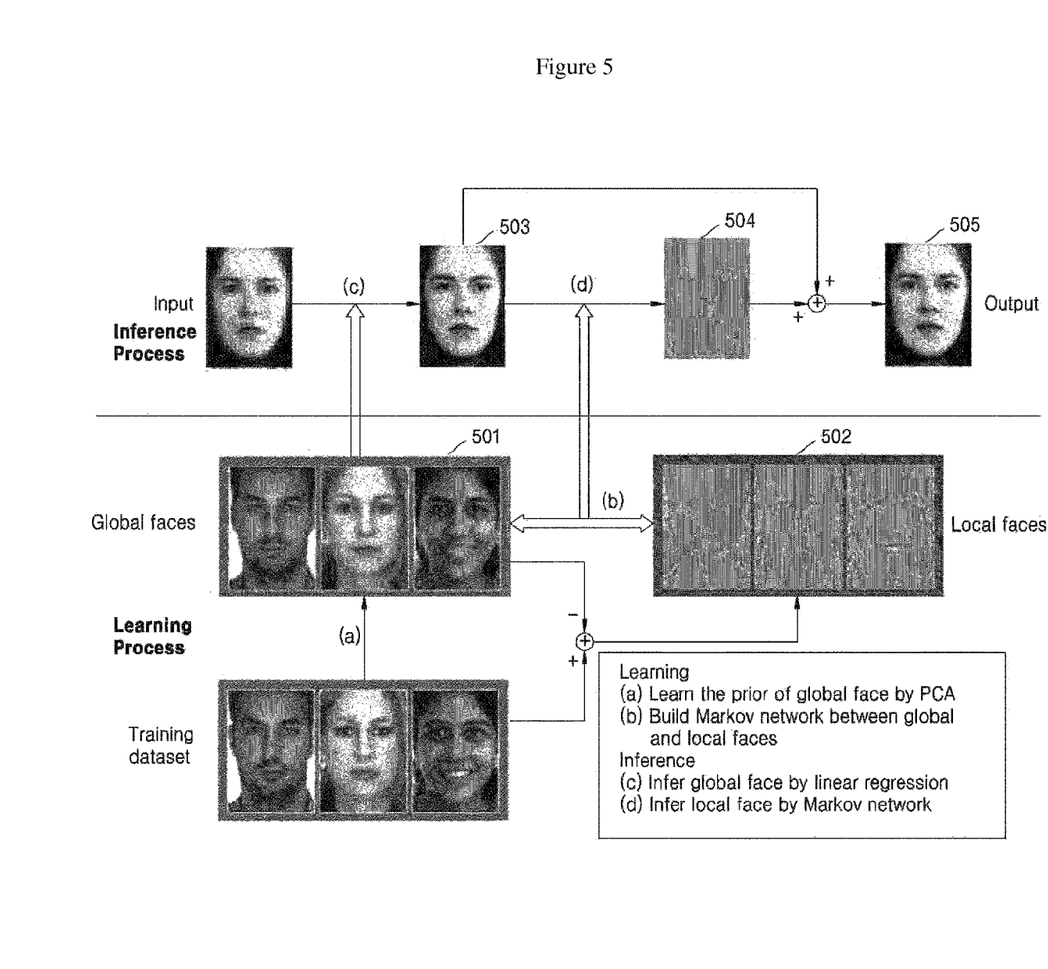
FIG. 5 is a view illustrating an operation of increasing a resolution of a facial image when a prerestoration process of the method of inferring a facial composite illustrated in FIG. 3 is performed, according to an exemplary embodiment of the present invention.

FIG. 5 is a view illustrating an operation of increasing a resolution of a facial image when a prerestoration process of the method of inferring a facial composite illustrated in FIG. 3 is performed, according to an exemplary embodiment of the present invention.

According to the present embodiment, the hallucination technique is used to first improve a resolution of the facial image.

The hallucination technique is a multi-stage statistical modeling technique that integrates a global parametric model and a local nonparametric model of a face.

Referring to FIG. 5, global faces 501 and local faces 502 mean a low-frequency factor that represents the entire shape of the facial image and a high-frequency factor that represents detailed features of the facial image. An optimum global image 503 is an image that satisfies a restriction condition given in an eigen subspace comprised of eigenvectors of a training dataset, and an optimum local image 504 is obtained by inferring an optimum global image that minimizes energy of a patch-based nonparametric Markov network and by inferring an optimum local image that corresponds to the inferred optimum global image. The optimum global image 503 and the optimum local image 504 that are derived through a series of processes are combined with each other such that a resultant image 505 having an improved resolution is output.

Figure 6:
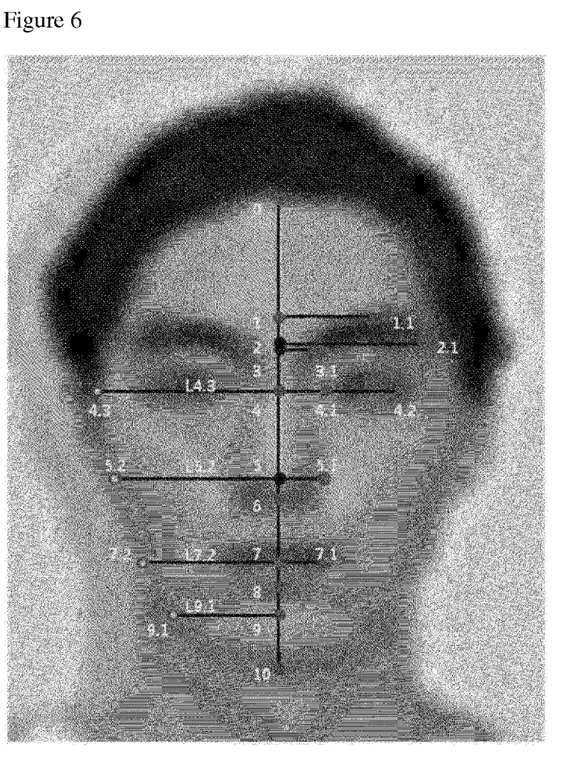
FIG. 6 is a view illustrating facial feature information used in the method of inferring a facial composite of FIG. 3, according to an exemplary embodiment of the present invention.

FIG. 6 is a view illustrating facial feature information used in the method of inferring a facial composite of FIG. 3, according to an exemplary embodiment of the present invention.

Referring to FIG. 6, the facial feature information according to the present embodiment may include feature points designated according to user's input and length information of segments that connect these feature points.

A representative reason why a face of a person who appears in a captured image cannot be accurately identified, may include a case that a face included in the captured image is not a frontal face, in addition to a low resolution of the captured image. When the face included in the captured image is not the frontal face, the number of features that can be used to recognize or identify the face is not large.

Thus, in the present embodiment, on the assumption that the face has a symmetrical shape, feature points of the facial image are defined only at one side of the symmetrical shape, ratio information of face regions are extracted from an image having a low resolution, and in order to utilize the extracted ratio information of face regions in identification or recognition, length information of segments between the feature points are used as feature information of the face regions.

In this case, a length that is a base for calculating the ratio of the face regions is the length of a segment that connects feature points 0 and 10, and lengths of all segments are divided by the length so that the length of the segment can be normalized. The normalized length of the segment is eigen information that indicate each face and enables classification and comparison between faces.

Segments L4.3, L5.2, L7.2, and L9.1 that represent outer features of the face among segments illustrated in FIG. 6 may be additionally included in eigen information of the face when the face included in the captured image is the frontal face.

Figure 7:
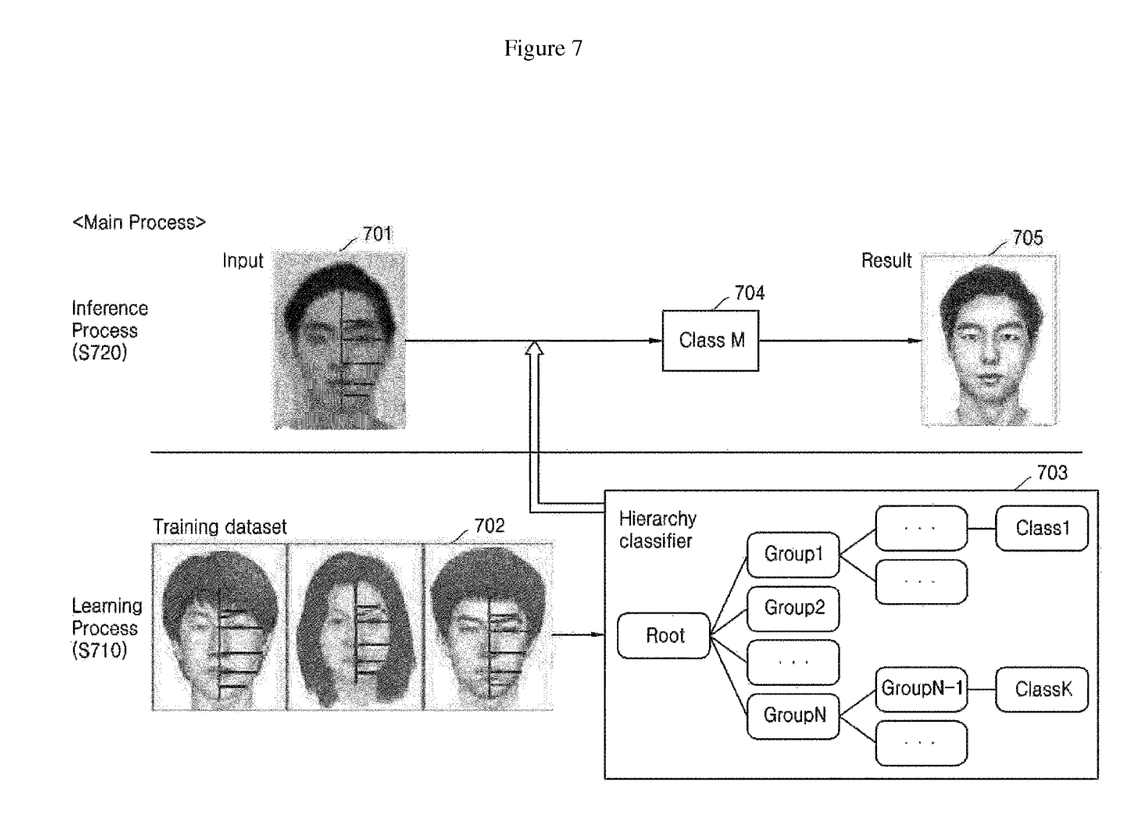
FIG. 7 is a view illustrating an operation of deriving a three-dimensional (3D) face shape model of the method of inferring a facial composite of FIG. 3 based on facial feature information, according to an exemplary embodiment of the present invention.

FIG. 7 is a view illustrating an operation of deriving a three-dimensional (3D) face shape model of the method of inferring a facial composite of FIG. 3 based on facial feature information, according to an exemplary embodiment of the present invention.

Referring to FIG. 7, a main process includes a learning process S710 performed in advance and an inference process S720 in which a facial type corresponding to an input facial image 701 is searched using a hierarchy classifier 703 that is obtained as a result of the learning process S710 and a 3D face shape model 705 that is the similarest to the facial image is derived.

A training dataset 702 used in the learning process S710 uses face shape models that are generated by making faces of a group to which a face to be searched belongs, for example, faces of Korean, as facial composites. These face shape models have wireframe information that indicate a face structure.

Thus, facial types of the group to which the face to be searched belongs, are hierarchically classified using a support vector machine (SVM) by using the wireframe information corresponding to predetermined feature points.

The SVM is a learning algorithm for searching a linear hyperplane that is used to classify given data into two classes and that is the farthest from the data.

Other learning algorithms simply search a hyperplane used to classify data, whereas the SVM is different from other learning algorithms in that the SVM searches a hyperplane having a maximum margin among many candidate planes used to classify data. Here, a margin refers to a minimum value of distances from a hyperplane to points (data). In order to classify points (data) into two classes 1 and −1 while maximizing the margin, a hyperplane needs to be positioned so that a minimum value of distances from the hyperplane to points that belong to class 1 and a minimum value of distances from the hyperplane to points that belong to class −1, and the hyperplane is referred to as a maximum-margin hyperplane.

In this way, the SVM may classify currently-stored data into two classes using the maximum-margin hyperplane and may provide a class to which newly-input data belongs, between two classes (prediction).

In the present embodiment, a class classification operation based on the SVM is repeatedly performed so that the facial types of the group to which the face to be searched belongs, are hierarchically classified into multi-stages and feature information according to facial type classified in this way are stored in a facial composite database in a hierarchical structure having a plurality of levels.

Facial types may be classified into several representative classes. However, the purpose of the method of inferring a facial composite according to the present embodiment is not to select a particular facial type but to generate a face shape model that is the similarest to the facial image based on feature information according to facial type. Thus, the class classification operation based on the SVM may be repeatedly performed so that facial types can be classified in the hierarchical structure having a plurality of levels.

In the inference process S720, feature points of a predetermined item are set to the facial image 701 input through preprocessing using user's input, facial feature information are extracted based on the set feature points, and the extracted facial feature information is input to the hierarchy classifier 703.

Once the facial feature information are input, information regarding a class of the hierarchical structure of the hierarchy classifier 703 to which the facial feature information belong, are obtained from the SVM of the hierarchy classifier 703, and a facial type corresponding to the facial image 701 is searched from the already-established facial composite database based on the obtained class information 704 to derive the face shape model that is the similarest to the facial image 701.

The face shape model derived through the above procedure may serve as an initial facial composite model that may be a starting point in making a facial composite of a criminal in a situation in which a face of the criminal who appears in the captured image cannot be accurately identified. Thus, the method and apparatus for inferring a facial composite according to the present invention contribute to criminal arrest and enable a low-resolution image captured by a surveillance camera to be more efficiently used.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of inferring a facial composite comprising:
pre-processing a facial image, the pre-processing comprising removing a background light source from the facial image and increasing resolution of the facial image;
receiving a user's input regarding a point of the facial image in response to a determination regarding success or failure of the pre-processing;
extracting facial feature information regarding an item so as to identify the facial image based on the received user's input;
searching a facial type that coincides with the extracted facial feature information using a support vector machine (SVM) from a facial composite database in which feature information according to facial type is learned through the SVM, is classified in a hierarchical structure having a plurality of levels, and is stored; and
generating a facial composite for generating a face shape model based on the searched facial type.

2. The method of claim 1, wherein the facial feature information comprises a feature point according to the user's input and length information of segments that connect the feature point with another point of the facial image.

3. The method of claim 1, wherein the generating of the facial composite comprises:
generating an initial face shape model corresponding to the searched facial type;
displaying the generated initial face shape model and receiving a user's correction instruction on the displayed initial face shape model; and
completing a face shape model by correcting the initial face shape model based on the received user's correction instruction.

4. The method of claim 1, wherein, in response to the determination indicating that pre-processing of the facial image fails, receiving of the user's input.

5. An apparatus for inferring a facial composite comprising:
a user input device configured to receive a user's input regarding a point of a facial image;
a pre-restorer configured to remove a background light source from the facial image and increase a resolution of the facial image;
a facial feature information extractor configured to extract facial feature information regarding an item so as to identify the facial image based on the received user's input;
a facial composite database in which feature information, according to facial type that have been learned through a support vector machine (SVM), is classified in a hierarchical structure having a plurality of levels and is stored;
a facial composite database search engine configured to search a facial type that coincides with the extracted facial feature information using the SVM from the facial composite database; and
a facial composite generator configured to generate a facial composite that is used for generating a face shape model based on the searched facial type.

6. The apparatus of claim 5, wherein the facial feature information comprises a feature point according to the user's designation and length information of segments that connect the feature point and another point of the facial image.

7. A method of inferring a facial composite comprising:
performing a pre: restoration process of removing a background light source from a facial image and of increasing a resolution of the facial image;
determining whether the facial image having an increased resolution through the prerestoration process is successfully restored;
in response to a determination that restoration of the facial image having the increased resolution fails, receiving a user's input regarding a point of the facial image;
extracting facial feature information regarding an item so as to identify the facial image based on the received user's input;
searching a facial type that coincides with the feature information according to facial types from a facial composite database in which feature information according to facial type has been learned; and
generating a face shape model based on the searched facial type.

8. The method of claim 7, wherein the facial feature information comprises a feature dot according to the user's input and length information of segments that connect the feature dot with another point of the facial image.

9. The method of claim 7, wherein the generating of the facial composite comprises:
loading an initial face shape model corresponding to the searched facial type from the facial composite database;
displaying the loaded initial face shape model and receiving user's correction instruction on the displayed initial face shape model; and
completing a face shape model by correcting the initial face shape model based on the received user's correction instruction.

10. The method of claim 7, wherein feature information according to facial type has already been learned through a support vector machine (SVM), is classified in a hierarchical structure having a plurality of levels, and is stored in the facial composite database.

11. The method of claim 7, wherein the searching of the facial type comprises:
searching a class that belongs to the hierarchical structure of the facial composite database that coincides with the extracted facial feature information using the SVM; and
deriving a facial type corresponding to the searched class as a facial type that coincides with the extracted facial feature information.

12. The method of claim 1, wherein removing the background light source from the facial image during pre-processing comprises a multi-scale retinex (MSR) technique.

13. The method of claim 1, wherein increasing resolution of the facial image during pre-processing comprises a hallucination technique.

* * * * *